(12) United States Patent
Specht et al.

(10) Patent No.: US 6,299,090 B1
(45) Date of Patent: Oct. 9, 2001

(54) DEVICE FOR RESTRAINING A SEAT BELT

(75) Inventors: Martin Specht, Feldafing (DE); Steve Marshall, Low Seaton (GB)

(73) Assignee: Breed Automotive Technology, Inc., Lakeland, FL (US)

( * ) Notice: Subject to any disclaimer, the term of this patent is extended or adjusted under 35 U.S.C. 154(b) by 0 days.

(21) Appl. No.: 09/448,261

(22) Filed: Nov. 24, 1999

(30) Foreign Application Priority Data

Jun. 15, 1999 (DE) ................................................ 199 27 270

(51) Int. Cl.$^7$ .................................................. B60R 22/46
(52) U.S. Cl. ............................................... 242/374; 60/632
(58) Field of Search .............................. 242/374, 379.1; 280/805, 806; 297/470, 471, 472, 476, 477, 478; 60/632, 638

(56) References Cited

U.S. PATENT DOCUMENTS

| | | |
|---|---|---|
| 3,891,271 | 6/1975 | Fieni . |
| 3,942,819 | 3/1976 | Schwanz et al. . |
| 4,927,175 | 5/1990 | Fohl ...................................... 280/806 |
| 5,284,307 | 2/1994 | Kotama .................................. 242/374 |
| 5,468,019 | 11/1995 | Blasé et al. ............................ 280/805 |
| 5,842,344 | 12/1998 | Schmid ................................... 60/632 |
| 5,871,236 | 2/1999 | Bauer et al. ........................... 280/806 |

FOREIGN PATENT DOCUMENTS

| | | |
|---|---|---|
| 9308273 | 6/1993 | (DE) . |
| 29520307 | 4/1996 | (DE) . |
| 19545795 | 3/1997 | (DE) . |
| 4426479 | 1/1999 | (DE) . |
| 0919747 | 6/1999 | (EP) . |
| 2306409A | 5/1997 | (GB) . |
| 2332397A | 6/1999 | (GB) . |
| 10067300 | 3/1998 | (JP) . |
| WO891430 | 2/1989 | (WO) . |

Primary Examiner—John M. Jillions
(74) Attorney, Agent, or Firm—Lonnie Drayer (57) ABSTRACT

A restraint device for a seat belt that can be wound on a belt reel has a belt tightener adapted to be driven by a propellant gas. The ignition of the propellant gas increases the working pressure in the pressure chamber so that the driving part of the belt tightener is moved in the driving direction. A load limiter cooperates with the belt reel and, after blocking of the belt reel, allows extraction of belt webbing with energy consumption. The working pressure in the pressure chamber can be reduced by a gas blowout passageway and, when the load limiter is actuated, the driving part remaining in a driving connection with the belt reel can be moved counter to the driving direction.

21 Claims, 8 Drawing Sheets

DEVICE FOR RESTRAINING A SEAT BELT

FIELD OF THE INVENTION

The present invention relates generally to a seat belt for use in a vehicle, and more specifically to a device for restraining a seat belt.

BACKGROUND OF THE INVENTION

A seat belt is wound on a belt reel, for example an automatic belt retractor. A belt tightener can be brought into driving connection with the belt reel in order to eliminate belt slack from the wound seat belt and/or the belt webbing extending across the vehicle occupant. For example in the event of a crash the belt tightener assures that the seat belt rests firmly on the vehicle occupant's body and excessive forward displacement is prevented. A driving part of the belt tightener is activated by a propellant gas which acts in a pressure chamber and has a specific working pressure so that the driving part is moved in the driving direction and the belt reel and the seat belt are driven in a retraction direction. A load limiter allows decelerated extraction of belt webbing with energy consumption after tightening of the seat belt and during blocking of the belt reel, can also be connected to the belt reel. An excessive load due to the applied seat belt on the vehicle occupant's body during this forward displacement is therefore avoided, as the seat belt protracts due to the decelerated extraction of belt webbing.

In the prior art, the activation of the pretensioner can on occasion adversely interfere with the normal operation of the blocking process of the belt reel and the operation of the load limiter of the seat belt. If the retensioning process is initiated early, for example ignition of the propellant gas within 6 ms after the crash, the piston is able to complete the working stroke, and the residual pressure in the guide tube neither influences the blocking process nor operation of the load limiter. During normal initiation (for example normal ignition) within a period of up to about 15 ms after the crash, the driving part, for example the linearly driven piston, can not complete the stroke and hence a residual gas is remaining in the guide tube. The residual pressure results in a force that additionally acts on the force limiter and can cause an unacceptable high load of the belt webbing on the body of the vehicle occupant during his forward displacement. If the working pressure is initiated even later, for example due to ignition of a propellant gas within a period of about 15 ms to 25 ms after the crash, preliminary and/or principal locking of the blocking device can occur prior to tightening but is eliminated again on tightening. If a principal blocking pawl is used, it is removed again from the blocking teeth of the belt reel during tightening. The vehicle occupant's body begins to be displaced forwardly owing to the late initiation of the tightening process and therefore exerts an increased force via the belt webbing and the belt reel on the driving part counter to the retensioning direction. The working stroke of the driving part is limited so that an excessive build-up of pressure is brought about at its rear in the pressure chamber by the propellant gas. This can lead to rupture of the tightener drive system resulting in a rapid drop in pressure and, owing to the forward displacement of the vehicle occupant, the rotation of the belt reel is accelerated such that it is no longer possible to control the preliminary and principal blocking. The webbing is then unwound without deceleration during the forward displacement of the vehicle occupant. The risk of rupture of the tightener drive system also arises if the working pressure is initiated later, i.e. after 25 ms after the crash. A high load which can be as much as 1 kN and higher is applied to the driving part owing to the forward displacement of the vehicle occupant's body. An excessive working pressure is then created in the smallest space, since the driving part hardly moves or only slightly. A rapid reversal of the direction of rotation of the belt reel also occurs here. Therefore, control of the principal locking of the blocking device is no longer possible and the belt webbing is also extracted without deceleration.

DISCUSSION OF THE PRIOR ART

DE 295 20 307 U1 teaches a linear drive consisting of a piston and a cylindrical tube. The piston is driven in the cylindrical tube by a pyrotechnic propellant charge during tightening of the seat belt. To improve protection against rupture of the cylindrical tube, a rupture disc, located in the end wall of the piston, provides a means to decrease the pressure in the interior of the cylindrical tube after the tightening movement.

Furthermore, DE 93 08 273 U1 discloses a linear tightener in which the driving movement of the piston is transmitted via a toothed rack provided on the piston directly onto a gear wheel resting non-rotatably on the winding shaft. An effective linear drive of extremely simple design is thus created for tightening a seat belt.

DE 44 26 479 C2 teaches a load limiter optionally integrated in the belt reel of the retractor (i.e. torsion bar) which can limit forces exerted on the forwardly displaced body of the vehicle occupant.

SUMMARY OF THE INVENTION

The present invention provides a restraint device wherein, irrespective of the moment of release or ignition of the propellant gas, the restraint function of the belt retractor is reliably ensured after tensioning of the belt.

With the present invention, the working pressure in the pressure chamber is reduced optionally by a dampened blowout a specific time after initiation of the retensioning process, more specifically within a minimum period of time to ensure actuation of blocking of the belt reel, and optionally actuation of the load limiter. After the blocking of the belt reel, or of a part of the belt reel to be secured during the load limiting function, the driving part of the tightener remaining in a driving connection with the rotatable part of the belt reel can be moved counter to the driving direction. With the present invention, it is not necessary to release the driving part of the tightener, which may be a rotary piston, a linearly moved piston or the like, from the belt reel, for example by an uncoupling process, after the drive movement during tightening of the belt. The driving part can remain in a driving connection with the belt reel. This driving connection can be produced by a clutch which is actuated on activation of the tightener or can be ensured by engagement of the driving part with a rotary drive part, for example pinion, connected to the belt reel. The pressure is reduced by blowing out of the gas remaining in the pressure chamber after tightening until the driving part can be moved counter to the tightener drive direction.

The pressure-reducing device can be provided on the movable driving part or in a stationary limit of the pressure chamber. The pressure-reducing device can be activated after expiry of a specific period of time beginning with initiation of the working pressure. The belt reel or the part of the belt reel, which is to be secured during load limitation, is blocked for this period of time. The reduction in pressure can be produced, for example, by burning which is ignited on initiation of the working pressure and leads to a gradual reduction in pressure. The pressure-reducing device can also be designed as a weak point in the wall of the pressure chamber on the piston and/or the piston guide device. The weak point is opened after a predetermined minimum amount of time on attainment of a specific pressure value, optionally owing to the flow properties of the material at the weak point. This weak point is preferably provided on the driving part that can be designed as a linearly movable piston. The working pressure for tightening can be supplied, for example, by a pyrotechnically produced propellant gas, for example from a gas generator, or from a compressed gas source in which the propellant gas is kept on standby, for example from a hybrid gas generator.

The invention provides a compact tightener construction with few components, wherein only one driving part is moved linearly or rotationally essentially for the tightener drive and this movement can be converted directly into the rotation of the belt reel for tightening the seat belt. Despite this simple construction, as has been explained, the load-limiting function which is ensured by a load limiter integrated into the belt reel is at most only slightly impaired with reliable control of principal blocking of the belt reel.

The reduction in pressure in the pressure chamber can be ensured by active or passive pressure reduction within a minimum amount of time ensuring principal blocking of the belt reel. The pressure-reducing device can be provided in the guide of the driving part in the region of the pressure chamber or in the driving part or piston. A simple configuration can be achieved by a defined set breaking point that is preferably provided in the piston. The flow behavior of the material provided at the set breaking point, which is plasticized at the stresses occurring, allows timed opening of the set breaking point. A gas blowout passageway can also be produced by bulging of the material of the guide tube that is plastic at the stresses occurring. It is also possible to provide the guide tube with a blowout passageway that is cleared when the driving part has completed the tightening movement. It is also possible to destroy sealing elements, for example lip seals, on the driving part after tightening by melting, burning or the like, so that the drop in pressure in the pressure chamber is achieved. With an active pressure-reducing device, a passageway, normally closed, can be brought about after a specific minimum amount of time after the working stroke of the driving part by burning, melting or the like. Burning is preferably brought about by a priming cap that also sets propellant gas generation into operation, for example by a gas generator. Owing to a damped reduction in pressure or burning which requires a specific amount of time, preferably beginning with ignition of the propellant gas, a reliable blocking engagement, in particular a principal blocking pawl which requires a specific engagement time owing to its mass inertia, is achieved optionally after preliminary blocking and, if a load limiter is provided, a reliable load-limiting function is achieved.

BRIEF DESCRIPTION OF THE DRAWINGS

Embodiments of the invention are described in more detail hereinafter with reference to the figures, in which.

DETAILED DESCRIPTION OF THE INVENTION

Figure 1:
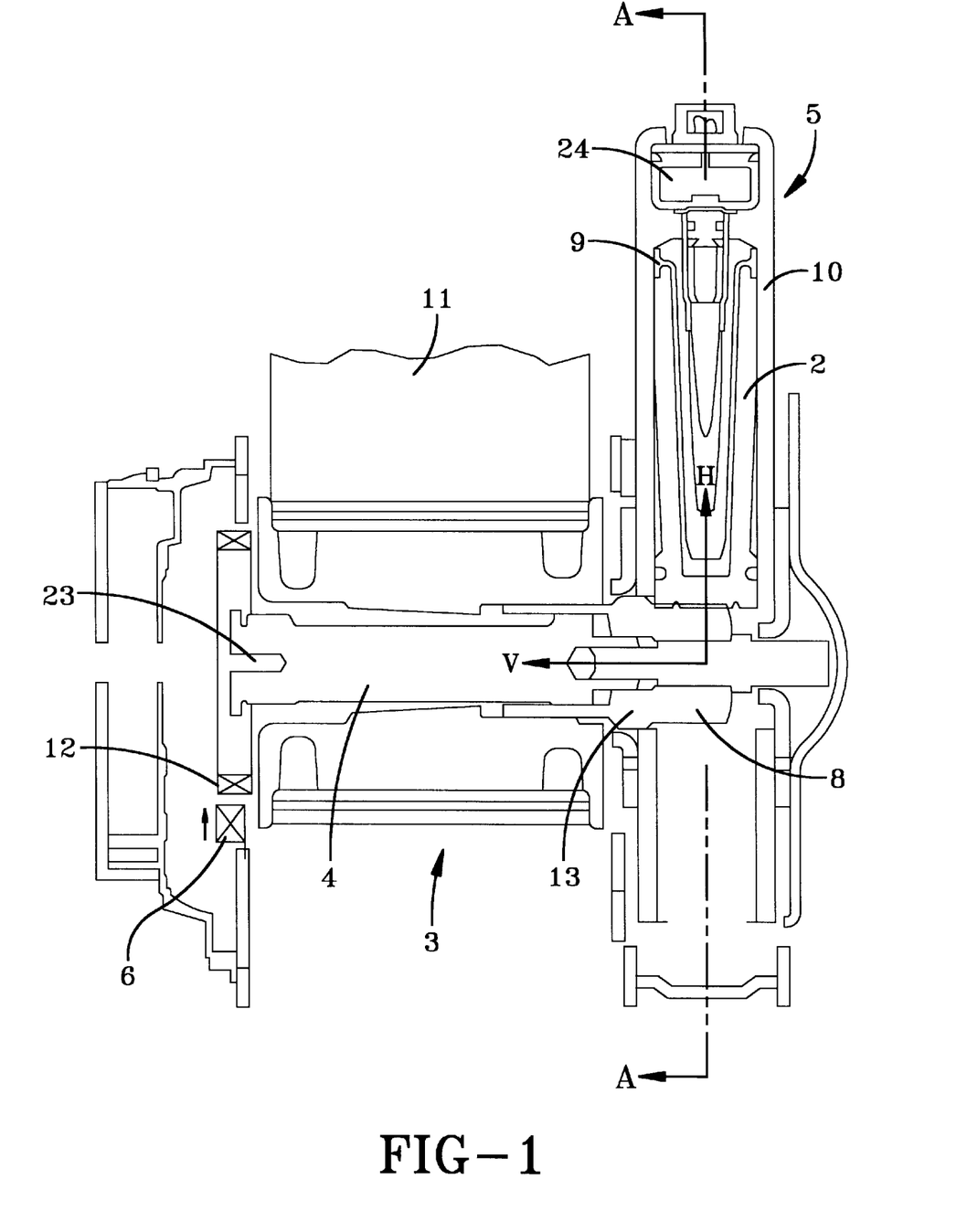
FIG. 1 is a schematic view of a restraint device according to a first embodiment of the invention.

The restraint device shown in FIG. 1 has a belt reel 3 on which a seat belt 11 can be wound and unwound in a known manner. If the belt reel is fitted in an automatic belt retractor, it can be subjected to the bias of a motive spring not shown in detail.

One side of the belt reel (the right-hand side in FIG. 1) is connected rigidly and non-rotatably to a load limiter 4. A seat belt 11 is taken up (wound) on this belt reel part. The load limiter 4 can be designed as a torsion bar. It is also possible, however, to design the load limiter 4 in the form of friction linings or the like which rest against one another. The other side of the belt reel 3 (the left-hand side) can cooperate with a blocking device 6, for example via a fixed bearing 23, with which the load limiter (torsion bar) 4 is connected to the blockable belt reel part on the left-hand side, so that the belt reel 3 can be blocked against rotation, in particular in the webbing extraction direction. The blocking device can be designed, for example, in the form of a movable pawl which engages in blocking teeth 12 provided on the belt reel 3, optionally after preliminary blocking which is triggered in response to the belt webbing and/or vehicle.

The restraint device in FIG. 1 also has a belt tightener 5. The belt tightener 5 has a driving part 2 in the form of a linearly displaceable piston. This piston is guided linearly in a tubular piston guide 10, as shown in the embodiments in FIGS. 2 to 15. A rotary piston drive can also be used instead of a linear belt tightener drive. In the embodiments illustrated, the driving part 2 is driven by a propellant gas produced in a pressure chamber 1. A pyrotechnically ignitable propellant gas, a propellant gas supplied by a hybrid gas generator or a propellant gas supplied from a pressure vessel can be provided in known manner as a propellant gas source 24. The driving part 2 is sealed from the internal wall of the tubular piston guide 10 by means of a seal 9 that can be designed as a peripheral lip seal.

For driving the driving part, a working pressure is produced in the pressure chamber 1 by the propellant gas so that the driving part 2 is moved along the tubular guide 10. On the driving part 2 there is provided a toothed rack 7 that meshes with a pinion 8. The rotating movement of the pinion 8 is transmitted to the belt reel 3. The seat belt 11 is therefore taken up on the belt reel for tightening purposes.

During normal winding and unwinding of the seat belt 11, the toothed rack 7 can be disengaged from the pinion so that the belt reel 3 can rotate without being influenced by the belt tightener. It is also possible, as shown in the embodiments in FIGS. 2 to 15, to keep the initial teeth of the toothed rack 7 in engagement with the pinion 8 even during normal operation of the belt reel. A clutch 13 designed, for example, as a centrifugal clutch is provided between the belt reel 3 and the pinion 8 and comes into engagement when the pinion 8 is driven. The pinion 8 can be connected directly to the belt reel 3 optionally via the load limiter 4. It is also possible to produce the rotary drive connection via an intermediate gear wheel to the belt reel 3 or one end of the load limiter 4. The clutch 13 can be dispensed with if the toothed rack 7 is disengaged from the pinion 8 during normal operation.

To prevent the blocking of the belt reel 3 by the blocking device 6 and the operation of the load limiter 4 from being impaired by the working pressure prevailing in the pressure chamber 1 even after tightening of the seat belt 11, the working pressure in the pressure chamber 1 is reduced. Various measures are provided for this purpose in the various embodiments of the belt tightener shown in FIGS. 2 to 15.

Figure 2:
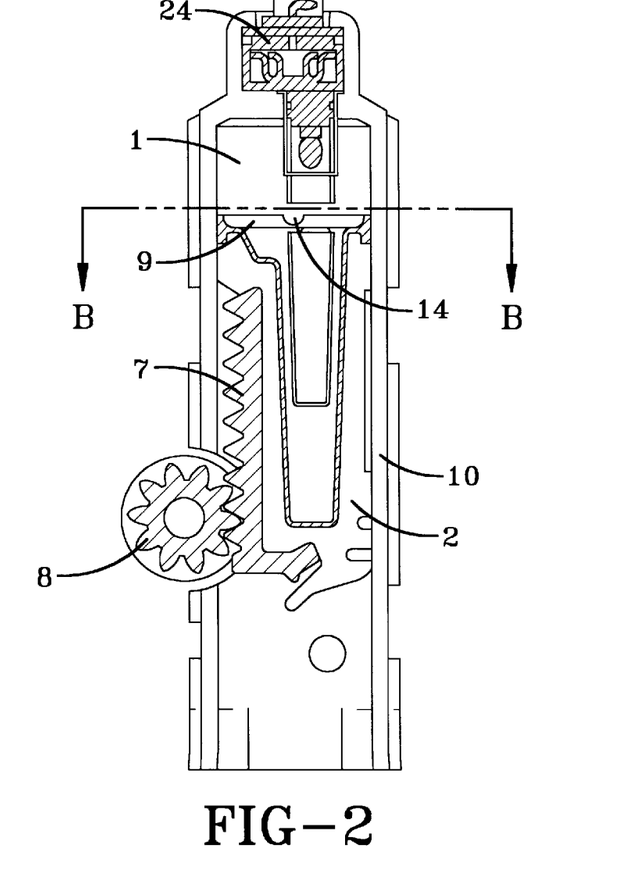
FIG. 2 is a partly sectional view along section line A—A in FIG. 1 of an embodiment of a belt tightener that can be used in the restraint device of FIG. 1.
Figure 3:
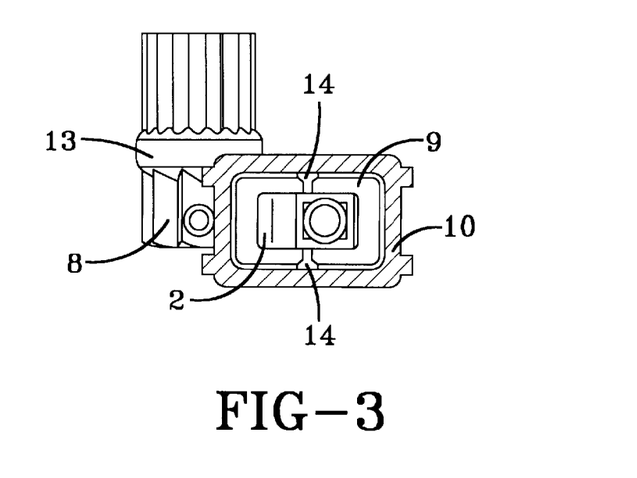
FIG. 3 is a sectional view of the belt tightener along section line B—B in FIG. 2.

Controlled burn-through of the seal 9 designed as a lip seal is provided in the embodiment of the belt tightener shown in FIGS. 2 and 3. The burn-through takes place at one or more burn-through points 14 of the seal 9. During the burning-through process, these burn-through points form progressively opening gas passageways. Accordingly, the working pressure in the pressure chamber 1 is progressively reduced until the driving part 2 can move, during extraction of belt webbing which is decelerated by the force limiter 4, counter to the driving direction during tightening once the blockable part of the belt reel 3 has been blocked.

Figure 4:
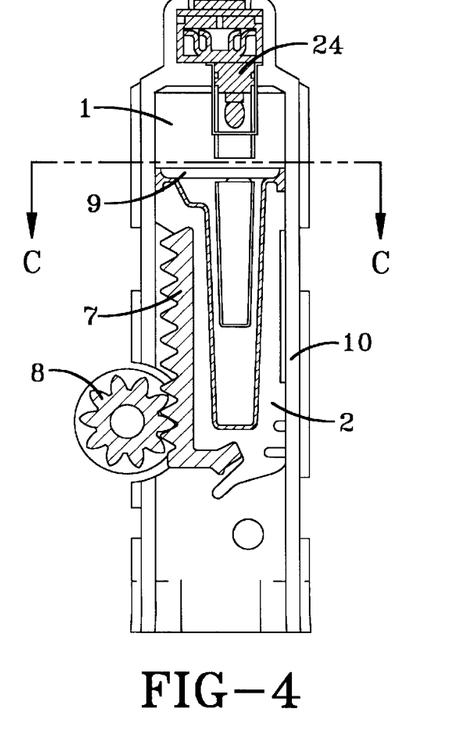
FIG. 4 is a sectional view of a further embodiment of a belt tightener that can be used in a restraint device of FIG. 1.
Figure 5:
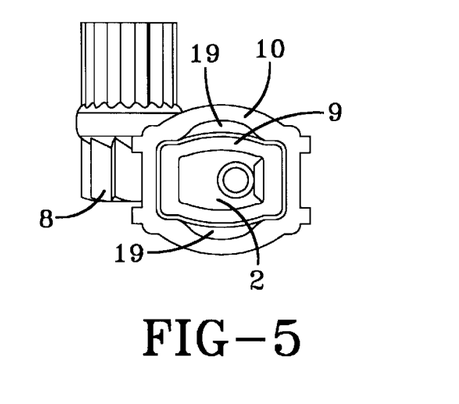
FIG. 5 is a sectional view along section line C—C in FIG. 4 of the belt tightener.

In the embodiment shown in FIGS. 4 and 5, the seal 9 is designed so that propellant gas can flow past the seal after the tightening process, so that a reduction in the working pressure in the pressure chamber 1 is achieved.

For this purpose, the material, for example aluminum, of which the piston guide 10 consists, is so dimensioned that it can be plastically deformed owing to the excessive working pressure prevailing in the pressure chamber, in particular in the region of the two lateral walls. Gas passageways 19 are then formed between the lateral walls of the guide 10 and the wall of the seal 19 surrounding the piston 2. In this way, the pressure in the pressure chamber 1 is reduced not abruptly as occurs during a rupture process but in a dampened manner within a specific period of time. The desired minimum period after initiation of the working pressure can be used up owing to the correspondingly selected flow properties of the material, until the final gas blowout passageways 19 are formed. The piston guide can be formed from an aluminum cold flow molding part.

Figure 6:
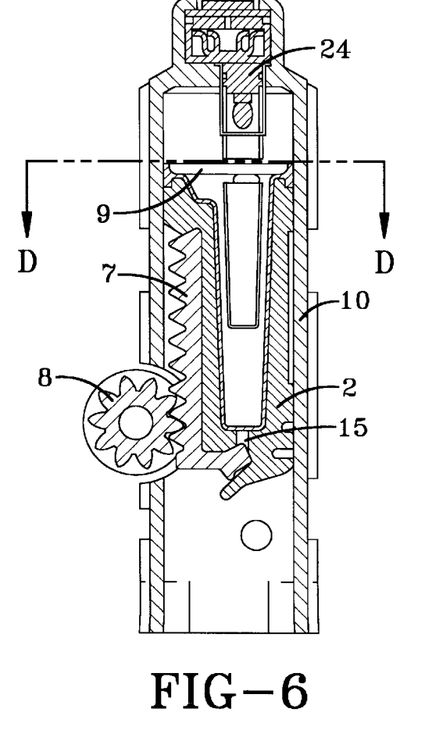
FIG. 6 is a sectional view of a further embodiment of a belt tightener that can be used in the restraint device of FIG. 1.
Figure 7:
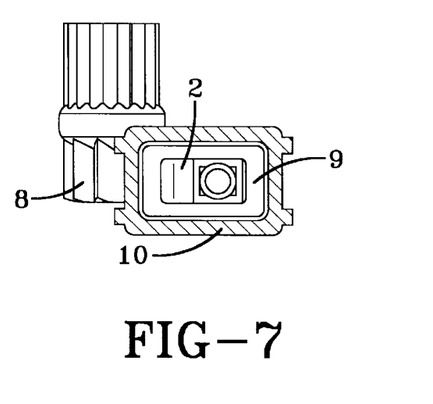
FIG. 7 is a sectional view along section line D—D in FIG. 6.

A burn-through point 15 is provided in the driving part (piston) 2 in the embodiment shown in FIG. 6. The gas blowout passageway desired for the reduction of pressure in the pressure chamber is formed gradually at this point by burning free within a specific period of time. In the embodiment illustrated, the burn-through point 15 is provided on the underside of the piston, i.e. at the front of the piston 2 as viewed in the driving direction. This arrangement of the burn-through point in the driving part is a preferred point.

Figure 8:
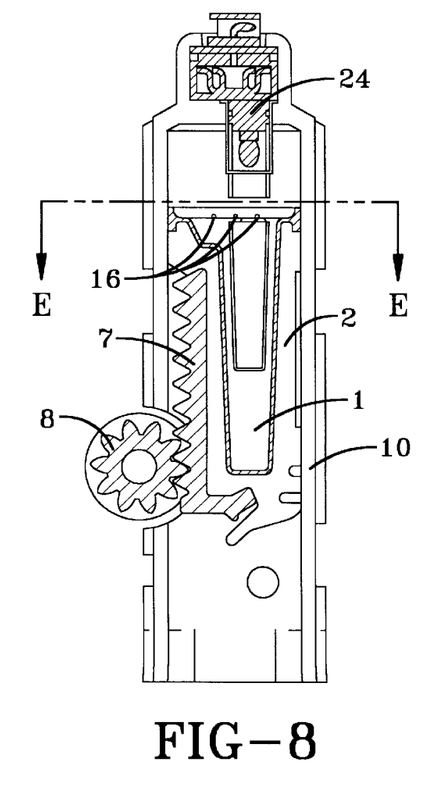
FIG. 8 is a sectional view of a further embodiment of a belt tightener that can be used in the restraint device of FIG. 1.
Figure 9:
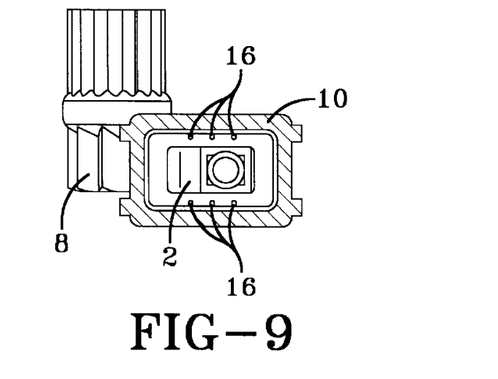
FIG. 9 is a sectional view along section line E—E in FIG. 8 of the belt tightener.

Burn-through elements 16 that burn free to form a plurality of gas blowout passageways in the seal 9, which are formed gradually within a specific burnout time, are provided on the seal 9 in the embodiment of FIGS. 8 and 9.

Figure 10:
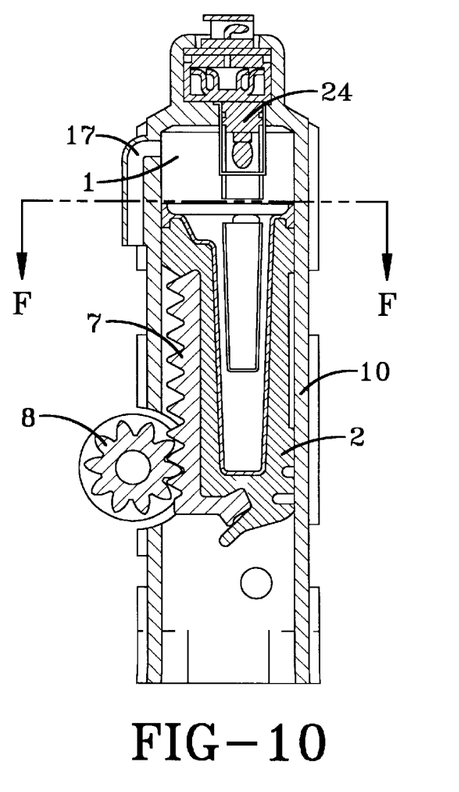
FIG. 10 is a sectional view of a further embodiment of a belt tightener that can be used in the restraint device of FIG. 1.
Figure 11:
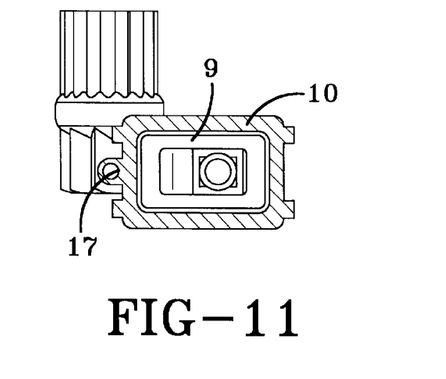
FIG. 11 is a sectional view along section line F—F in FIG. 10.
Figure 12:
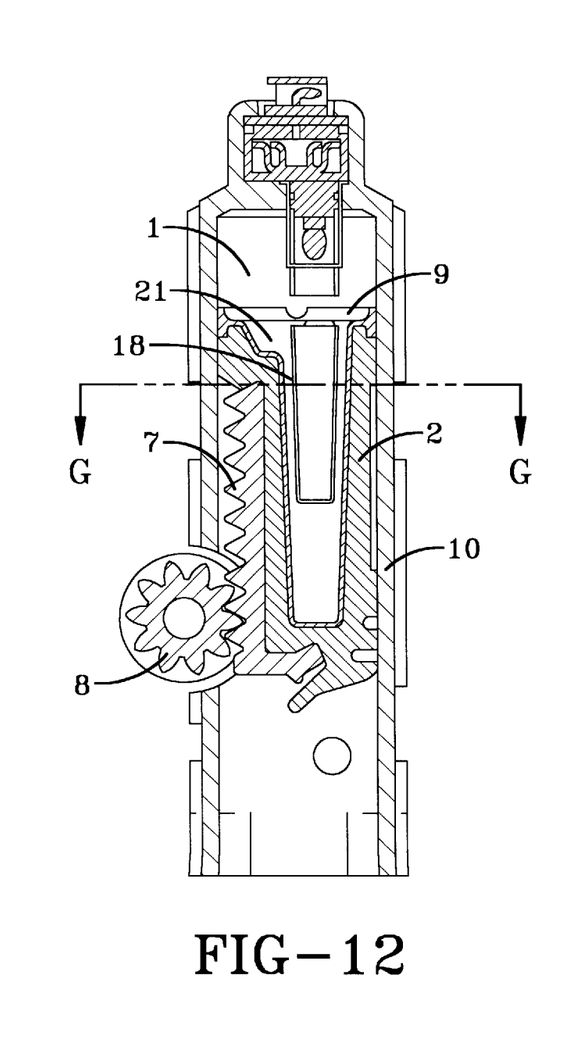
FIG. 12 is a sectional view of a further embodiment of a belt tightener that can be used in the restraint device of FIG. 1.
Figure 13:
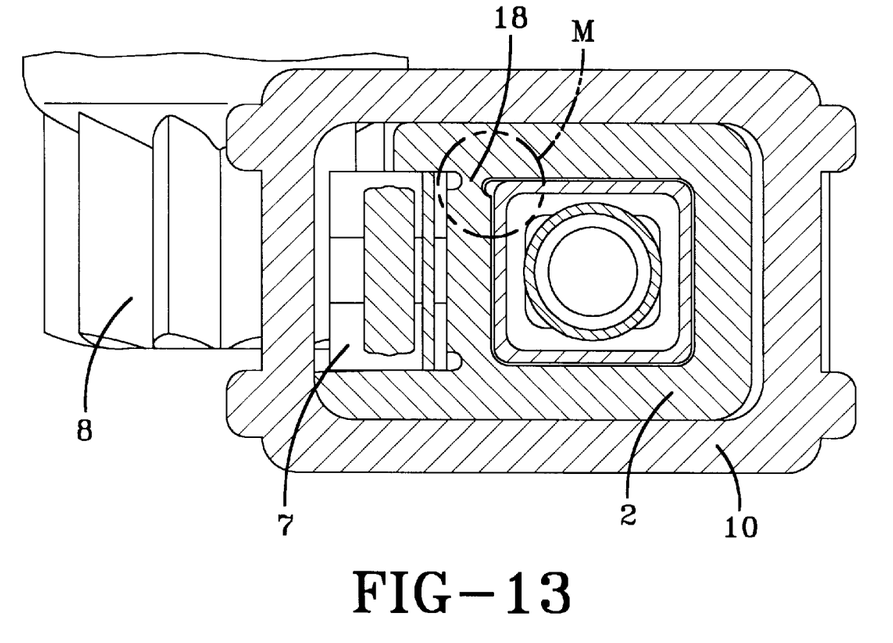
FIG. 13 is a sectional view of a belt tightener along section line G—G in FIG. 12.
Figure 14:
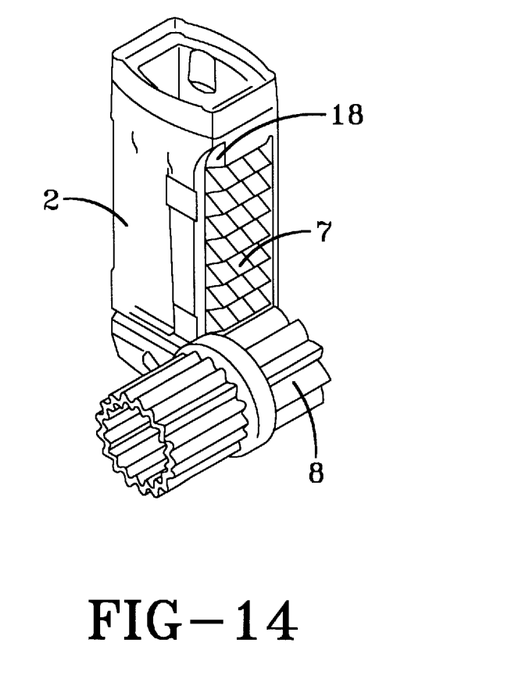
FIG. 14 is a perspective view of a driving part designed as a linearly driven piston with engagement in a pinion at the beginning of a tightening process.
Figure 15:
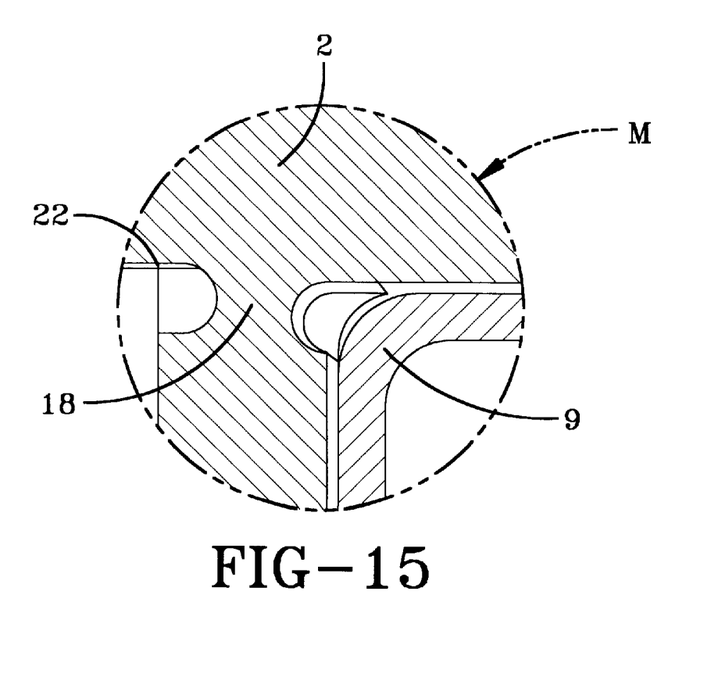
FIG. 15 is an enlarged view of detail M in FIG. 13.

In the embodiment shown in FIGS. 10 and 11, a burn-through point 17 which forms the delayed pressure reduction in the pressure chamber 1 during the burning free of a gas blowout passageway is provided in the limiting wall of the pressure chamber 1 or of the piston guide 10. A pyrotechnic charge can be provided in the burn-through point 15 or 17, for example by pressure insertion, in the embodiment in FIGS. 6 and 7 as well as in the embodiment in FIGS. 10 and 11. The burn-through point 17 can also be provided at a different point of the pressure chamber 1 or along the guide path of the driving part 2 during its tightening movement.

For example, a burn-through point 20 can be provided on a gas generator that is used as propellant gas source 24. For this purpose, the gas generator can be designed in the manner shown in FIG. 16. For this purpose, the gas generator has an igniter 25, for example in the form of a priming cap, with which a propellant charge 26 is ignited pyrotechnically for producing the propellant gas. With a hybrid gas generator, the igniter 25 can serve to liberate the propellant gas. Between the igniter 25 and the burn-through point 20 on the exterior of the gas generator is a burnout section through which the minimum time for opening of the burn-through point 20 is determined. The burnout section is ignited simultaneously with the ignition of the propellant charge 26. The burnout section can also extend outside the gas generator housing and be guided to a burn-through point 20 provided in the piston guide 10, as in the embodiment in FIGS. 10 and 11. If the gas generator is arranged in the driving part (piston) 2, the burn-through point can also be provided on the piston.

Figure 16:
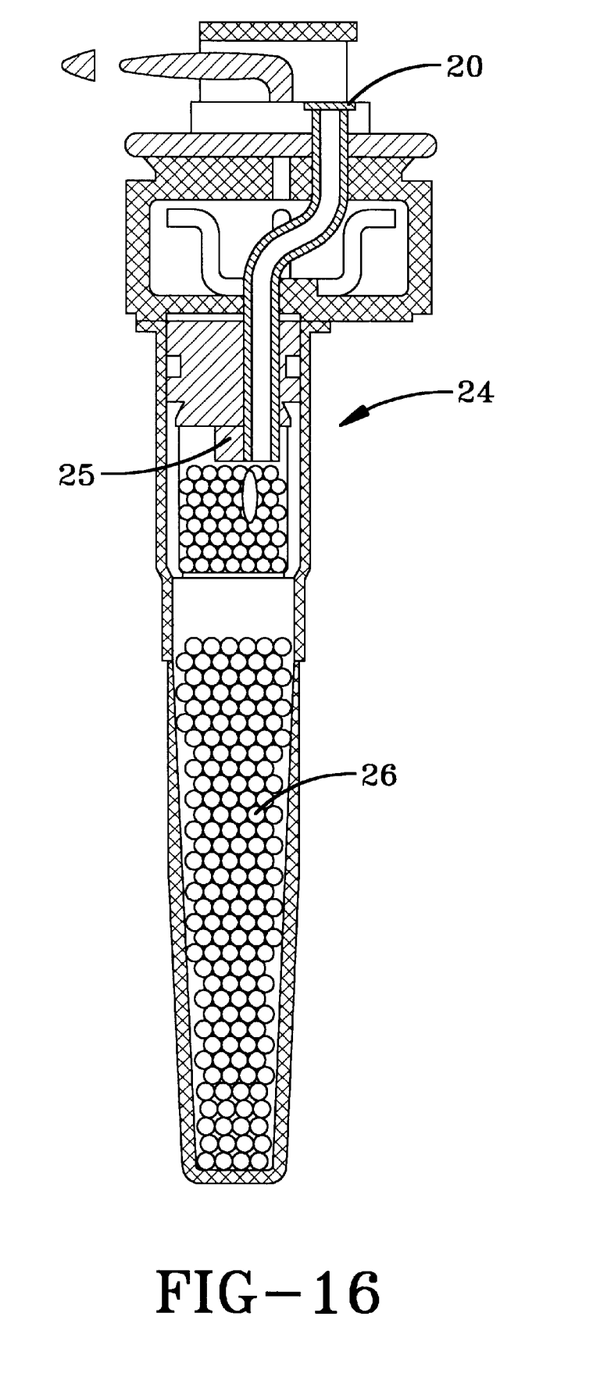
FIG. 16 shows a pyrotechnic gas generator with a burnout section that can be ignited at the moment of ignition of the propellant present in the gas generator.

Timed opening or burning free of the gas blowout passageway can be achieved by means of the burn-out section, independently of the path covered by the driving part during the tightening process. Burning free can be set into operation simultaneously with the activation of the propellant gas, for example during the ignition thereof. A reduction in the working pressure prevailing in the pressure chamber 1 is then achieved irrespective of the working stroke covered by the driving part 2.

In the embodiment shown in FIGS. 12 to 15, a weak breaking point 18 of the piston material, in particular aluminum, is provided in the piston, which is opened after a time delay after the working stroke of the driving part 2 owing to the working pressure prevailing in the pressure chamber 1 as a result of the flow properties of the material at the weak point. The weak point 18 is located at the upper end of the toothed rack 7 in the embodiment illustrated. It is formed at the point where two limiting walls of a cavity 21 formed in the driving part (piston) 2 abut in the piston, belonging to the pressure chamber 1, and form the weak point 18. The viscosity of the material of the set breaking point which is plastic at the stresses occurring is so adjusted that a specific period of time elapses before the breakage (tearing). The seal 9 in the region of the set breaking point 18 also opens. After the opening of the set breaking point 18, the propellant gas is able to escape or blow out via a gap 22 provided between the toothed rack 7 and piston 2. The driving part (piston) 2 is preferably designed as an aluminum die-casting.

In the embodiments illustrated the driving part (piston) 2 as well as the tubular guide 10 have a substantially rectangular cross section. The guide 10 is preferably produced from soft metal, in particular aluminum, as a cold flow molding part and can be caused to bulge by the pressure prevailing in the pressure chamber 1 after tightening. The gas blowout passageway can be formed between the seal 9 and the internal wall of the tubular piston guide 10 for reducing pressure in the pressure chamber 1.

Figure 17:
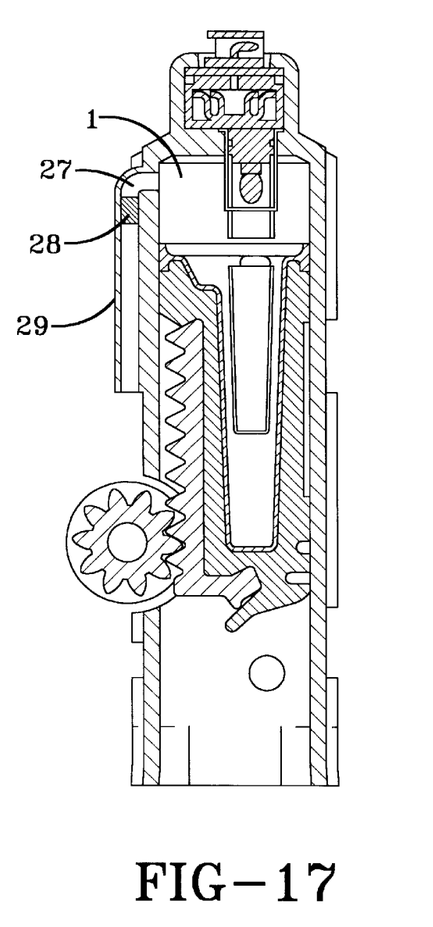
FIG. 17 shows an embodiment of the pressure-reducing device.
Figure 18:
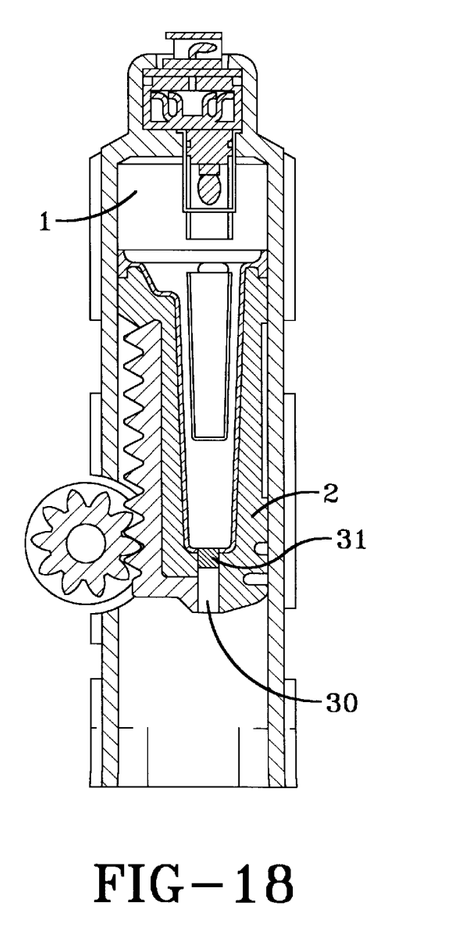
FIG. 18 shows a further embodiment of the pressure-reducing device.

A further chamber 27 connected to the pressure chamber 1 is provided in the embodiment shown in FIG. 17. This further chamber 27 is sealed by a sealing element 28, for example in the form of a plug. If an excessively high working pressure builds up in the pressure chamber 1 after the tightening process, the plug-like sealing element 28 is moved along a tubular guide section 29 which can be provided on the guide 10, from a corresponding pressure threshold. The space in which the working pressure prevails is therefore enlarged, so that a reduction in pressure is achieved. When the sealing element 28 has left the guide section through the exit at the lower end, complete pressure compensation with the exterior takes place. Owing to the length of the guide section 29 and the friction which the plug-like sealing element 28 exerts on the internal wall of the guide section 29, a specific period of time can be adjusted until a gas passageway from the pressure chamber 1 to the exterior is completely cleared. In the embodiment shown in FIG. 18, a guide section 30 is provided at the lower end of the driving part (piston) 2. This guide section 30 extends from the interior of the piston pertaining to the pressure chamber 1 to the exterior of the piston. This guide section 30 is also sealed by a plug-like sealing element 31. A pressure reduction in the pressure chamber 1 is also achieved during the movement of the sealing element 31 along the guide section 30. After a specific period of time, the sealing element 31 leaves the guide section 30, as in the embodiment in FIG. 17, so that the pressure chamber 1 is cleared completely to the exterior for pressure compensation.

Many changes and modification in the above-described embodiments of the invention can, of course, be carried out without departing from the scope thereof. Accordingly, that scope is intended to be limited only by the scope of the appended claims.

We claim:

1. A device for restraining a seat belt comprising:
    a belt tightener adapted to be driven by a propellant gas which acts in a driving direction on a movable driving part drivingly connected to the belt reel with a working pressure in a pressure chamber during driving,
    a blocking device for blocking the belt reel, wherein the working pressure in the pressure chamber can be reduced by a pressure-reducing device, and
    a gas blowout passageway created by the pressure reducing device after an expiry of a specific period of time beginning with initiation of the working pressure, the gas blowout passageway is cleared by burning, the burning of the gas blowout passageway is initiated by an igniter that starts the generation of the propellant gas.

2. The device for restraining a seat belt according to claim 1 further comprising a load limiter which cooperates with the belt reel and, after blocking the belt reel allows extraction of belt webbing, the driving part remaining in a driving connection with the belt reel can be moved counter to the driving direction when the load limiter is actuated.

3. The device for restraining a seat belt according to claim 1 wherein the pressure-reducing device is provided on the moving driving part or on the pressure chamber.

4. The device for restraining a seat belt according to claim 1 wherein the minimum time from the moment of release of propellant gas to the opening of the burn-through point can be adjusted by means of the burn-out section.

5. The device for restraining a seat belt according to claim 1 wherein the driving part does not make a driving connection with the belt reel during normal operation.

6. The device for restraining a seat belt according to claim 1 wherein the driving part comprises a toothed rack that engages a pinion connected to the belt reel.

7. A device for restraining a seat belt comprising:
    a belt tightener adapted to be driven by a propellant gas which acts in a driving direction on a movable driving part drivingly connected to the belt reel with a working pressure in a pressure chamber during driving,
    a blocking device for blocking the belt reel, wherein the working pressure in the pressure chamber can be reduced by a pressure-reducing device, and
    a gas blowout passageway created by the pressure reducing device after an expiry of a specific period of time beginning with initiation of the working pressure, the gas blowout passageway is formed by bulging of lateral walls of the pressure chamber.

8. The device for restraining a seat belt according to claim 7 further comprising a load limiter which cooperates with the belt reel and, after blocking the belt reel allows extraction of belt webbing, the driving part remaining in a driving connection with the belt reel can be moved counter to the driving direction when the load limiter is actuated.

9. The device for restraining a seat belt according to claim 7 wherein the pressure-reducing device is provided on the moving driving part or on the pressure chamber.

10. The device for restraining a seat belt according to claim 7 wherein the driving part does not make a driving connection with the belt reel during normal operation.

11. The device for restraining a seat belt according to claim 7 wherein the driving part comprises a toothed rack that engages a pinion connected to the belt reel.

12. A device for restraining a seat belt comprising:
    a belt tightener adapted to be driven by a propellant gas which acts in a driving direction on a movable driving part drivingly connected to the belt reel with a working pressure in a pressure chamber during driving,
    a blocking device for blocking the belt reel, wherein the working pressure in the pressure chamber can be reduced by a pressure-reducing device, and
    a gas blowout passageway created by the pressure reducing device after an expiry of a specific period of time beginning with initiation of the working pressure, the gas blowout passageway is formed by a weak point of material located at the upper end of a toothed rack after a time delay.

13. The device for restraining a seat belt according to claim 12 further comprising a load limiter which cooperates with the belt reel and, after blocking the belt reel allows extraction of belt webbing, the driving part remaining in a driving connection with the belt reel can be moved counter to the driving direction when the load limiter is actuated.

14. The device for restraining a seat belt according to claim 12 wherein the pressure-reducing device is provided on the moving driving part or on the pressure chamber.

15. The device for restraining a seat belt according to claim 12 wherein the driving part does not make a driving connection with the belt reel during normal operation.

16. The device for restraining a seat belt according to claim 12 wherein the driving part comprises a toothed rack that engages a pinion connected to the belt reel.

17. A device for restraining a seat belt comprising:
- a belt tightener adapted to be driven by a propellant gas which acts in a driving direction on a movable driving part drivingly connected to the belt reel with a working pressure in a pressure chamber during driving,
- a blocking device for blocking the belt reel, wherein the working pressure in the pressure chamber can be reduced by a pressure-reducing device, and
- a second chamber that is sealed from the exterior by a sealing element and is connected to the pressure chamber, the sealing element being movable to increase the volume of the pressure chamber, the sealing element is forced out of the second chamber at a specific pressure, wherein a passageway is created to the exterior.

18. The device for restraining a seat belt according to claim 17 further comprising a load limiter which cooperates with the belt reel and, after blocking the belt reel allows extraction of belt webbing, the driving part remaining in a driving connection with the belt reel can be moved counter to the driving direction when the load limiter is actuated.

19. The device for restraining a seat belt according to claim 17 wherein the pressure-reducing device is provided on the moving driving part or on the pressure chamber.

20. The device for restraining a seat belt according to claim 17 wherein the driving part does not make a driving connection with the belt reel during normal operation.

21. The device for restraining a seat belt according to claim 17 wherein the driving part comprises a toothed rack that engages a pinion connected to the belt reel.

* * * * *